Feb. 18, 1936.  A. WEBER  2,031,442
ADJUSTABLE HANDLE
Filed June 27, 1935  2 Sheets—Sheet 1
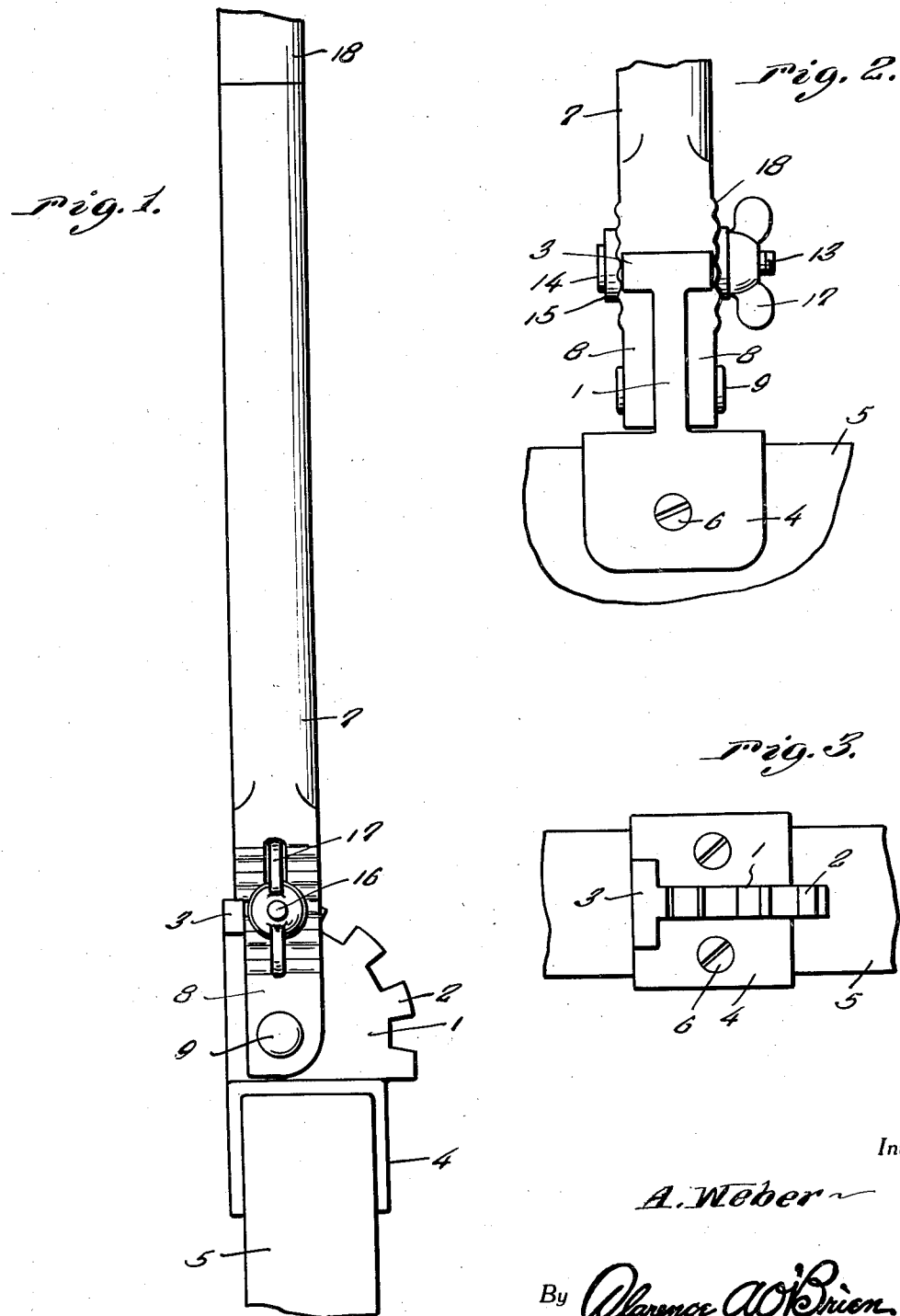
Inventor
A. Weber
By Clarence A. O'Brien
Attorney Feb. 18, 1936. A. WEBER 2,031,442
ADJUSTABLE HANDLE
Filed June 27, 1935 2 Sheets-Sheet 2
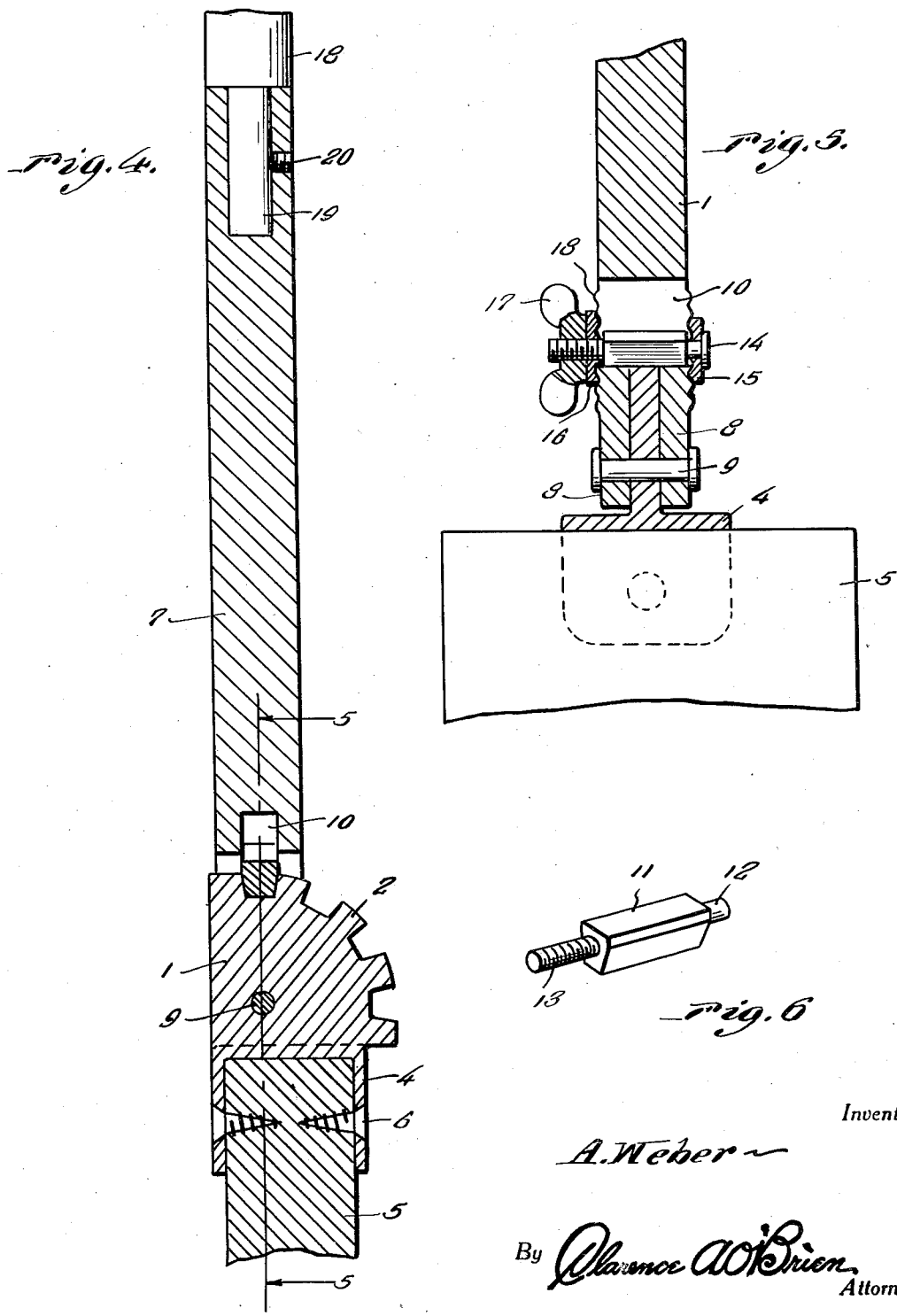

Patented Feb. 18, 1936

2,031,442

UNITED STATES PATENT OFFICE 2,031,442

ADJUSTABLE HANDLE

Alphons Weber, Syracuse, N. Y.

Application June 27, 1935, Serial No. 28,744

1 Claim. (Cl. 306—12)

This invention relates to an adjustable handle for brooms, brushes and other implements, the general object of the invention being to provide a segmental toothed part for fastening to the head of a brush, broom or the like, and a handle pivoted to the segmental part and having an adjustable part for engaging the teeth for holding the handle in adjusted position on the segmental part.

This invention also consists in certain other features of construction and in the combination and arrangement of several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a side view of the device.

Figure 2 is a fragmentary front view thereof, showing the device attached to the head part of an implement.

Figure 3 is a fragmentary top plan view with the handle removed.

Figure 4 is a longitudinal sectional view through Figure 1.

Figure 5 is a section on the line 5—5 of Figure 4.

Figure 6 is a view of the adjustable locking member.

In these drawings the numeral 1 indicates a segmental member having the teeth 2 formed on its curved edge, the vertical edge of the member being enlarged as shown at 3. This member rises from a base 4 which is of channel-shape in cross section so as to receive a portion of a head 5 of a brush, broom or the like, the part 4 being attached to the part 5 by screws 6. A handle 7 has a forked end, the prongs 8 of which straddle the member 1 and these parts are pivoted to the member 1 by a bolt or rivet 9. A slot 10 is formed in the handle and has its lower portion intersecting the space between the prongs and a wedge-shaped block 11 is slidably arranged in the slot and is adapted to engage a space formed by a pair of teeth on the segmental member as shown in Figure 4 when the block is in lowered position. A reduced part 12 extends from one end of the block and a reduced threaded part 13 extends from the other end, these parts projecting from the handle and a head having corrugations on its inner face is fastened to the part 12 by upsetting the outer end of said part as shown at 14. The head is shown at 15. A washer 16 having corrugations on its inner face is placed on the part 13 and then a thumb nut 17 is threaded on the part 13 to hold the block in adjusted position. Those portions of the handle engaged by the parts 15 and 16 are corrugated as shown at 18. The upper portions of the sides of the block are straight so that these straight portions will engage the straight side walls of the slot 10 during movement of the block, the rest of the side portions of the block sloping downwardly and inwardly to form the wedge, and the spaces between the teeth 2 are shaped to receive the wedge shaped part of the block.

Thus it will be seen that when it is desired to adjust the handle it is simply necessary to loosen the thumb nut, raise the block and then turn the handle on its pivot to the desired position after which the block is lowered into engagement with the space between two of the teeth and then the thumb nut is tightened to hold the block in this position. The widened part 3 prevents the handle from being moved beyond a vertical position to one side of such position and when desired an extension handle 18 can be attached to the handle 7 by placing the reduced part 19 of the extension handle in a socket formed in the handle 7 and fastening the part 19 in the socket by a set screw 20.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

In a device of the class described, a head of segmental shape and having teeth formed on its curved wall, the spaces between the teeth being of substantially wedge-shape, a handle having a forked end with the prongs straddling the head and pivoted thereto, said handle having a slot passing therethrough at right angles to the space between the prongs with the lower part of the slot intersecting said space, an elongated block slidably arranged in the slot and having the upper portion of its sides straight to engage the side walls of the slot with the rest of the sides sloping inwardly and downwardly to form a wedge-shaped part for engaging a wedge-shaped space between a pair of teeth, the ends of the block being reduced and projecting from the slot, a head connected with one reduced end for engaging a side of the handle, the other reduced end being threaded, a washer on said threaded part for engaging an opposite side of the handle, and a nut on the threaded part and contacting the washer, and said sides of the handle being corrugated and the head on the reduced end of the block and the washer being corrugated to engage the corrugated parts of the handle.

ALPHONS WEBER.